Jan. 29, 1963 D. M. HAM 3,075,399
GEAR ASSEMBLIES WITH PHASED TOOTH DISPLACEMENT
Filed Nov. 23, 1960 3 Sheets-Sheet 2
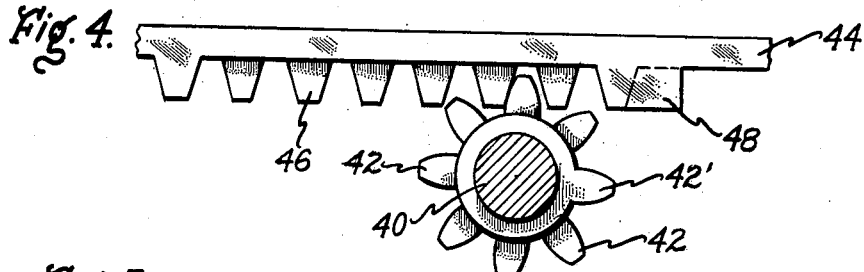
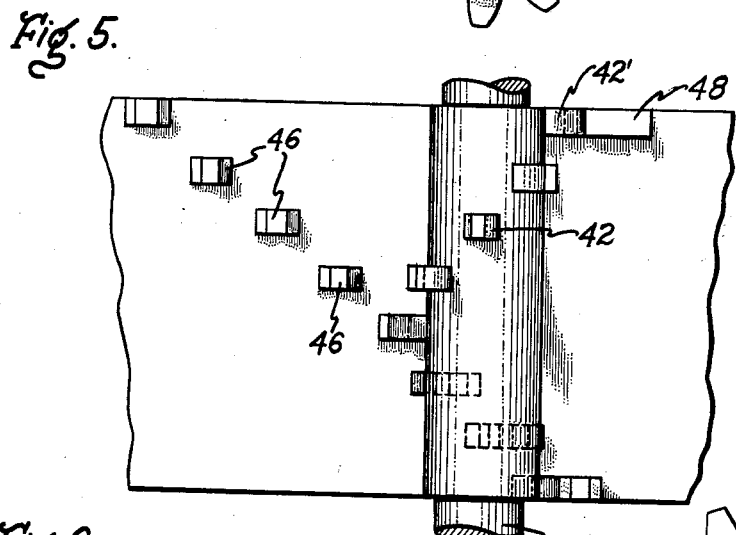
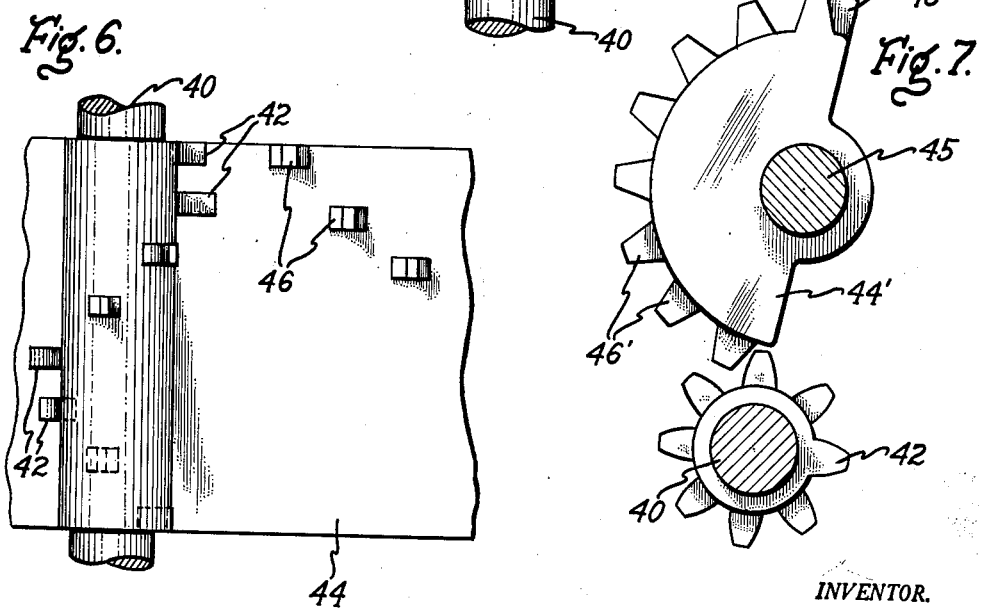
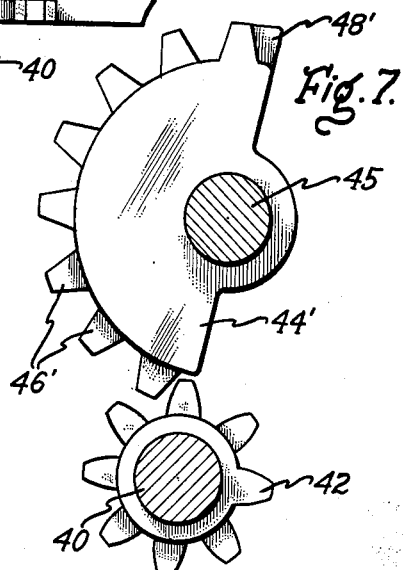
INVENTOR.
Donald M. Ham,
BY Francis X. Doyle
His Attorney.

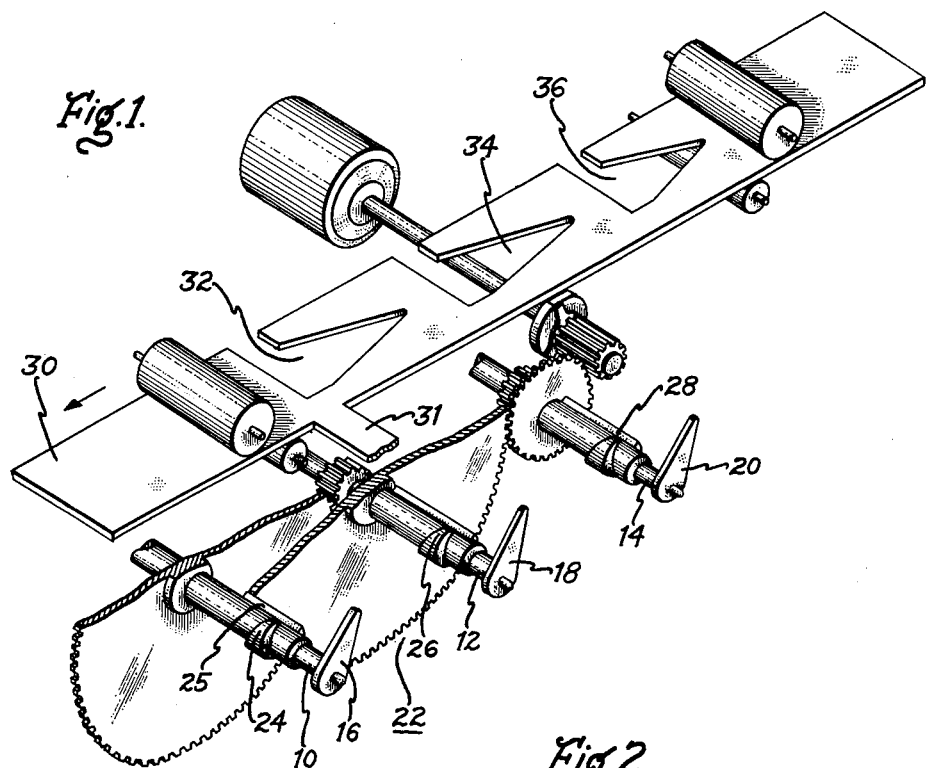
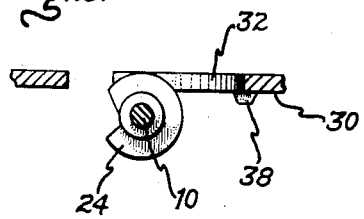
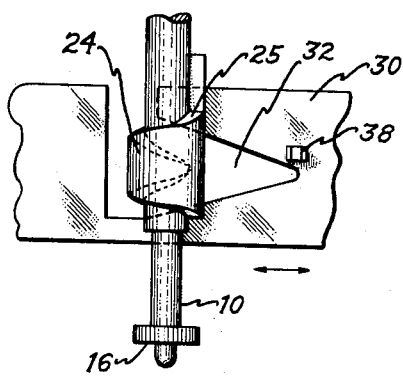

Jan. 29, 1963
D. M. HAM
3,075,399
GEAR ASSEMBLIES WITH PHASED TOOTH DISPLACEMENT
Filed Nov. 23, 1960
3 Sheets-Sheet 3
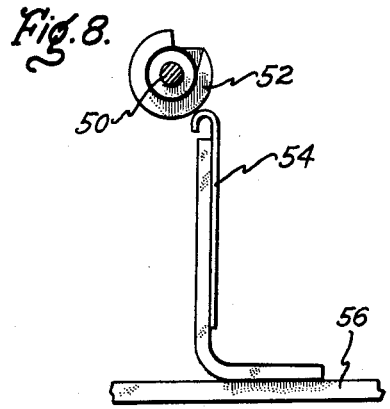
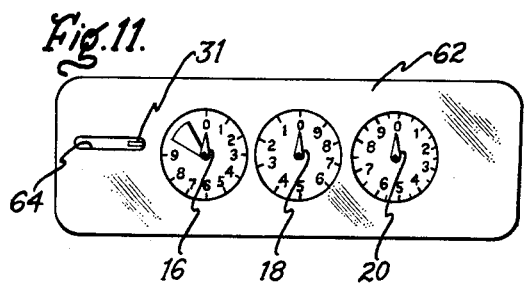
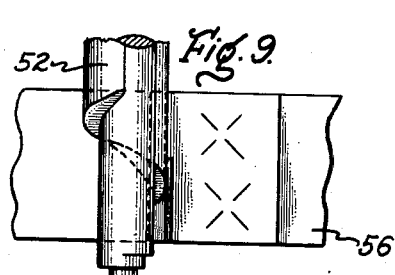
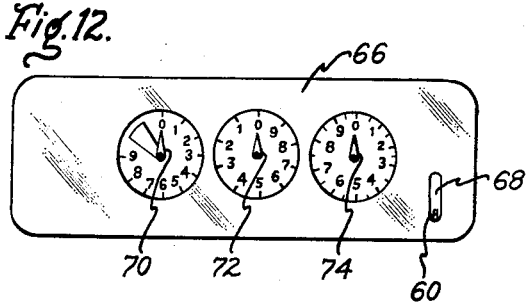
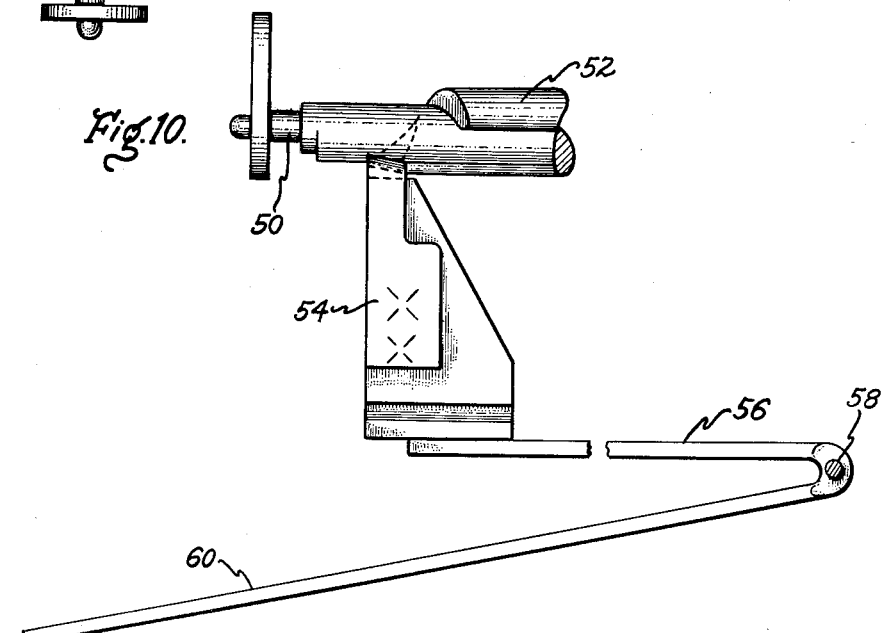
INVENTOR.
Donald M. Ham,
BY Francis K. Doyle
His Attorney.

United States Patent Office 3,075,399
Patented Jan. 29, 1963

3,075,399
GEAR ASSEMBLIES WITH PHASED TOOTH DISPLACEMENT
Donald M. Ham, Rochester, N.H., assignor to General Electric Company, a corporation of New York
Filed Nov. 23, 1960, Ser. No. 71,267
8 Claims. (Cl. 74—412)

This invention relates to gear assebties and more particularly to gear assemblies wherein the gears are provided with phased tooth displacement.

In many types of mechanisms utilizing a rotatable shaft, it is desirable at some point of the operation of the mechanism to either position or reposition the rotatable shaft to a fixed or a predetermined position. In many instances where the shaft does not make a number of revolutions, it is common practice to provide a pinion on the shaft and to drive a large diameter sector gear from the pinion. The gear ratio in this instance is selected so that the sector gear does not move through a large angle, and it is then a simple manner to reset the moving shaft to a fixed position by returning the sector gear to its former fixed position. However, where a large number of rotatable shafts are utilized and where the shafts to be reset to a fixed or predetermined position may make a hundred revolutions, instead of one or two, it becomes extremely complex to provide merely a pinion on the shaft and a large diameter sector gear for the pinion. Of course, with a larger number of revolutions, it will be apparent that the pinion will generally be driven completely beyond the sector gear. Of course, in many mechanisms it is impossible, from a space viewpoint, to provide a sector gear of a sufficiently large diameter to be certain that the pinion on the shaft does not drive beyond the extremity of the sector gear. It has been known to use a heart-shaped cam on the shaft with a radially moving follower. However, this type of device is subjected to sliding friction between the cam and the follower, and the bearing reactions of such mechanisms are many times that which would be required if the shaft could be positioned by simple gear action. There is an additional objection to the heart-shaped cam with follower in that there is a limited angular position when the point of the cam will be aligned with the tip of the follower. In this position, no magnitude of force on the follower can cause the rotation of the shaft. Thus, it can be seen that in mechanisms utilizing rotatable shafts, where it is desired to position or reposition the rotatable shaft to a fixed or predetermined position, it is desirable to provide a method of repositioning which will positively and accurately return the rotating shaft to a predetermined position.

Some of the possible mechanisms where this type of repositioning of a shaft are required are those mechanisms wherein it is desirable to obtain a shaft reversal with a time lapse in between such shaft reversals. Another mechanism would be a maximum-type device where the driven member is to be left in its position of the furthest advance. A further device would be one requiring the resetting of a shaft to a zero position by a fixed movement of the driver member.

In patent application Serial Number 71,353, filed November 23, 1960, for an "Indicating Demand Meter," in the name of Donald M. Ham, and assigned to the same assignee as the present invention, there is disclosed an indicating demand meter in which a plurality of shafts are driven through a number of rotations to provide an accurate indication of the demand used during a given demand interval. In that application, there is disclosed a phased gear assembly for repositioning the shafts to a predetermined zero position at the end of each demand interval. This application discloses and claims the phased gearing which are utilized in the indicating demand meter of that patent application, Serial Number 71,353.

As herenbefore noted, there is a great need in the art to which this invention pertains for a means which will enable the positioning or repositioning of a rotatable shaft to a fixed or predetermined position. This desired shaft movement may be obtained through one way gearing between the shaft and a driving member. It will be obvious that if one way action may occur between the geared member of the shaft and the driving member that the action of the gears in meshing will provide the desired repositioning of the shaft to a predetermined or fixed position while the reversal of the driving member, which repositions the shafts, will not have any action on the gear associated with the shaft and therefore will leave the shaft in the desired predetermined position. It is, therefore, one object of this invention to provide phased gear assemblies which will permit one way action to occur between geared members.

A still further object of this invention is to provide a rotatable shaft having a gear means thereon meshing with a driving gear so as to reposition the shaft in a desired predetermined position, regardless of the number of rotations through which the rotatable shaft has moved.

A still further object of this invention is to provide phased gear assemblies whereby a rotatable shaft may be repositioned to a desired predetermined or fixed position by a given movement of the driving phased gear.

In carrying out this invention in one form, a rotatable shaft, which is to be reset to a predetermined or fixed position, is provided with a phased gear means which is wrapped about its cylindrical surface. A driving gear means having a complementary phased gear is movable into engagement with the phased gear means on the rotatable shaft and, on engagement therewith, rotates the shaft to its desired predetermined or fixed position. On movement of the gear means away from the rotatable shaft, no contact is made between the phased gear means on the rotatable shaft and the driving gear, thereby leaving the rotatable shaft in its desired predetermined position.

The invention which is desired to be protected by this application is particularly pointed out and distinctly claimed in the claims appended hereto. However, it is believed that the objects of this invention, as well as other objects and advantages thereof, will be more clearly understood by reference to the following description when taken in connection with the accompanying drawings wherein:

FIGURE 1 is an exploded view of rotatable shafts and a rack means utilized to reposition the rotatable shafts to a desired predetermined position, showing one form of the invention of this application;

FIGURE 2 is a partial sectional end view of the form of invention shown in FIGURE 1, showing the contacts between the rack and the gear means;

FIGURE 3 is a partial bottom view of the form of the invention of FIGURE 1, showing a shaft and rack member in operation;

FIGURE 4 is a side view of a shaft and rack member showing another form of the invention.

FIGURE 5 is a bottom view of FIGURE 4;

FIGURE 6 is a bottom view, similar to FIGURE 5, showing the rack and shaft prior to engagement of the gears;

FIGURE 7 is a side view, similar to FIGURE 4, showing another embodiment of this form of the invention;

FIGURE 8 is an end view of another form of this invention.

FIGURE 9 is a top view of the form of invention shown in FIGURE 8;

FIGURE 10 is a side view of the form of invention shown in FIGURE 8, showing another view of the driven gear member;

FIGURE 11 is a view of an indicating demand meter dial which may utilize the first or second form of the invention; and FIGURE 12 is a view of an indicating demand meter dials which may utilize the form of invention shown in FIGURES 8–10.

Referring now to the drawings in which like numerals are used to indicate like parts throughout, there is shown a rotatable shaft member which utilizes a phased gear means wrapped about its cylindrical surface. A driving gear means is provided with a complementary phased gear which may take the form of a rack or an upstanding gear tooth, which may be moved into contact with the phased gear means on the cylindrical surface of the shaft. When the driving phased gear contacts the phased gear means on the rotatable shaft, it causes the rotation of the shaft to a desired predetermined or fixed position.

Referring now to FIGURE 1 of the drawing, there is shown a phased gear assembly which comprises a number of rotatable shafts 10, 12 and 14, the shafts being provided with pointer means 16, 18, and 20. These pointers may be used in conjunction with dial members, such as are shown in FIGURES 10 and 11 of the drawings, to provide an indication of the amount of electrical power which is used. This power use may be recorded by means of driving the various pointers through the gear train 22 indicated in FIGURE 1. It is desirable that the shafts 10, 12, and 14, be provided with a resetting means such that a given interval, after the recording has been taken from the meter, the shafts may be set so that the pointers 16, 18, and 20, will be repositioned to the 000 indication on the dials. In order to provide this desired repositioning means the shafts 10, 12, and 14 are provided with phased gear means in the form of helical gear means 24, 26, and 28, which are wrapped about the cylindrical surfaces of the shafts 10, 12, and 14, respectively. A driving gear means, to reposition the shafts 10, 12, and 14, is shown in the form of a rack member 30, the rack member being provided with phased gear means in the form of a number of openings 32, 34, and 36 therein. As can be seen from FIGURE 1, the gear openings 32, 34, 36 are in a V-shaped form so as to correspond to the shape of the helical gear means 24, 26, 28, which are wrapped about the cylindrical surfaces of the shafts 10, 12, and 14, respectively.

Considering FIGURES 2 and 3, it is seen the manner in which the gear openings 32, 34, and 36 engage the helical-phased gear means 24, 26, and 28. In FIGURE 2 where there is shown gear opening 32 and phased gear means 24, it can be seen, that in operation of the device, that the phased gear means 24 fits within the opening 32 in the rack member 30.

Referring now to FIGURE 3, which also shows the gear opening 32 in the rack 30, and the helical-phased gear means 24 on the shaft 10, it can be seen that the phased gear means 24 would fill the gear opening, which is phase gear means 32, if it were unwrapped from the shaft 10. However, it will also be noted that at the end of opening 32, that is, the left-hand side of opening 32 as viewed in FIGURE 3, the gear opening is provided with an additional width which is greater than the widest point on the phased gear means 24. It will, therefore, be apparent, that if rack 30 is moved to the right sufficiently so that gear means 24 is over the widest portion of the opening 32, that shaft 10 will be able to rotate freely without any interference from rack 30 or phase gear means 32. When it is desired to reset the shaft 10, and pointer 16, to its zero position, then movement of the rack 30 to the left will bring phased gear means 32 into engagement with the phased gear means 24 on shaft 10. The contact will of course be between the edges of the phased gear opening 32 and the helical faces of the helical phased gear means 24. This contact will result in the rotation of phased gear means 24 and with it shaft 10 and pointer 16 until the bottom edge 25 of phased gear means 24 contacts the base of the rack 30. The contact between these two surfaces, that is the bottom edge 25 of phased gear means 24 and the base of the rack 30, will result in the positive positioning of rotatable shaft 10 and pointer 16 in the desired zero position. The rack 30 may then be moved to the right until the widest opening of gear means 32 is directly over the phase gear means 24 to allow the free rotation of shaft 10 without any movement of the rotatable shaft 10. Arm or lever 31 may be used, as shown in FIGURE 10, to move the rack member 30 to the desired positions.

In certain instances, where extremely accurate positioning of the shaft 10 and its pointer 16 is required, it may be desirable to provide a stop means on the rack 30, such as the raised portion 38 indicated in both FIGURES 2 and 3. The raised portion 38 can be readily and accurately machined at very low cost on the base of the rack member 30. This raised portion 38 will prevent any surface inaccuracies in the base of rack 30 from moving the shaft 10 slightly as the rack 30 is withdrawn, which may result from a rubbing friction between the base of the rack 30 and the bottom edge 25 of the phased gear means 24. Of course, it will be understood, that in most devices where this form of the invention will be utilized, the extreme accuracy which may be obtained by use of the raised portion 38 will not be necessary and the slight deviation, which may occur due to the rubbing friction between the base of rack 30 and the bottom edge 25 of the phase gear means 24, will not be of sufficient moment to disturb the accuracy of the mechanism on which this is to be used.

A second embodiment of the phased gear assemblies of this invention is shown in FIGURES 4, 5, and 6. In these figures the phased gearing wrapped about the rotatable shafts is shown in the form of a phased spur gear, while the driving phased gear is shown as phased or staggered teeth on a rack member. Referring specifically to FIGURE 4, there is shown the edge view of a rotatable shaft member 40 which is provided with phased or staggered spur teeth 42 wrapped about shaft member 40 and a rack member 44, which is the driving phase gear, being provided with phased teeth 46. FIGURE 5 discloses the staggering of the teeth 42 on the rotatable shaft 40 and the staggered teeth 46 on the rack 44. From the views shown in FIGURES 4 and 5 it can be readily seen that the gear teeth 42 are arranged about the cylindrical surface of the shaft 40 in a staggered manner such that no two teeth will be in the same plane taken through the shaft 40. In a similar manner the teeth 46 are staggered across the width of the rack 44 so as to complement, or be in a complementary position with, the staggered teeth 42 on the shaft 40. In order to provide a positive stop means, a flat raised surface 48 is provided on the rack 44 so that a staggered tooth on the cylinder 40 will engage the stop means 48 at the desired predetermined setting of shaft 40.

From the above, it can be seen that when it is desired to reset shaft 40 to its desired zero or predetermined position, the rack member 44 is moved to the left. During this movement the phased teeth 46 on rack member 44 will engage those phase teeth 42 on the shaft 40 which are on the upper surface of the cylindrical surface of shaft 40 as viewed in FIGURE 4. As the teeth 46 contact teeth 42 the shaft 40 will be caused to rotate until the staggered tooth 42' on the shaft 40 comes into contact with the fixed stop means 48 on the rack member 44. It will be obvious that by proper design considerations of the staggered teeth 42 and 46 on the shaft 40 and rack 44 respectively that any desired position of the rotatable shaft 40 may be obtained.

Referring now to FIGURE 6 of the drawing, in which the rack 44 is shown in its position for the free rotation of shaft 40, it can be seen that when the rack 44 is moved completely to the right so that the teeth 46 are on the right side of the shaft 40, as viewed in FIGURE 6, that shaft 40 will be completely free to rotate without any interference from the rack member 44. Of course, when it is desired to reset the shaft member 40, the rack member 44 is moved to the left, as viewed in FIGURE 6, and the teeth 46 will contact the teeth 42 to rotate the shaft to the desired predetermined position. Of course, it will be apparent that due to the staggering of the teeth 46 on the rack 44, and the teeth 42 on the shaft 40, that after the shaft member 40 has been repositioned to its desired predetermined or fixed position, that the rack member 44 may then be moved to the right as viewed in FIGURE 6 so as to disengage the rack 44 from rotating shaft 40. The movement of rack 44 to the right will leave the shaft 40 in its previously predetermined position since there will be no contact between the teeth 46 and the teeth 42, on the movement of the rack member 44 to the right. Thus, it can be seen one way gear action occurs between the phased gear member 44 and the phased gear member on the shaft 40, which results in the desired predetermined positioning of the rotatable shaft 40.

Of course, it will be obvious that the rack member 44 could be in the form of a sector gear, rather than a plane member. In FIGURE 7, the driving phased gear is shown as a sector gear 44' having the phased teeth 46' staggered across the circumferential face of the sector gear 44'. The staggering of the teeth 46' will be in the same manner as shown for the teeth 46 in FIGURES 5 and 6, except that the teeth will be formed about the curved surface of the sector gear 44' as shown in FIGURE 7. The sector gear is rotatably mounted about a shaft 45. When it is decided to reset the shaft 40, the sector gear 44' is rotated in a downward direction. The teeth 46' contact the compentary teeth 42 on the shaft 40 and rotate shaft 40 to the desired reset position in the same manner as previously discussed with reference to the rack 44.

Referring now to FIGURES 8, 9 and 10, there is shown a third embodiment of the invention in which a phased gear means, having only a single helical surface, is wrapped around the cylindrical surface of a rotatable shaft and a single upstanding phased gear means is provided which, by a swinging or translation motion, will contact the helical surface of the phased gear means to cause the desired repositioning of the rotatable shaft. Referring now specifically to FIGURE 8, there is shown a rotatable shaft 50 having a phased gear means 52 wrapped around its cylindrical surface. Below the phased gear means 52 and in the same plane therewith is a single upstanding phased gear means 54. The phased gear means 54 is shown as being attached to a surface 56 which may be translated or swung in an upward direction to bring the upstanding phase gear means 54 in contact with the helical surface of the phased gear means 52. The top view of this embodiment is shown in FIGURE 9 where it can be seen that the phased gear means 52 is only provided with a single helical surface as opposed to the double helical surface provided on the phased gear means 24, 26, and 28, of the embodiment disclosed in FIGURES 1-3.

FIGURE 10 shows one manner in which the upstanding phased gear means 54 may be translated or swung into contact with the helical surface of the phased gear means 52. As shown in FIGURE 10, the surface 56 to which a helical gear means 54 is attached is pivotally mounted about a pivot member 58. The other side of the surface 56 is in the form of a lever or arm member 60 which is fixedly attached to the member 56 at the pivot point. In this manner, movement of the member 60 in its upward direction will cause member 56 to also move in an upward direction. Of course, movement of member 56 will swing the upstanding phased gear means 54 in an upward direction into engagement with the helical surface of the phase gear means 52. As will be noted from the shape of phase gear means 54, it is designed so that it will make a sliding contact with the helical surface of phase gear means 52 and thereby cause the rotation of the rotatable shaft 50 until it reaches the desired predetermined position.

Referring now to FIGURE 11, there is shown the dial face 62 of an indicating demand meter which may be utilized with the embodiment of the inventions shown in FIGURES 1-3 and FIGURES 4-6. As shown in FIGURE 11, a lever member 31, which may be the operating lever of the rack member 30 of FIGURES 1-3, extends through an opening 64 in the dial face 62. Movement of the lever 31 to the left as viewed in FIGURE 11 will cause the resetting of the dial pointers 16, 18, and 20, through the operation of the driving phased gear means and the phased gear means of each of the cylindrical surfaces of the shafts which carry the pointer 16, 18 and 20, as has been more fully described with reference to FIGURES 1-3 and 4-6. Considering FIGURE 12, there is shown a dial face 66 which may be utilized with the form of the invention disclosed in FIGURES 8-10. In this embodiment, a lever member 60 extends through an opening 68 in the dial face 66 which may be, for example, the lever 60 disclosed in FIGURE 10. Movement of lever 60 in an upward direction as viewed in FIGURE 12, will cause the resetting of the pointers 70, 72, and 74 by the movement of the phased gear means which is attached to the lever member 60 into engagement with the phased gear means which is wrapped about the cylindrical surfaces of the shaft members which carry the pointers 70, 72, and 74, in a manner similar to that disclosed for the operation of the embodiment shown in FIGURE 8-10.

From the above it will be obvious that there has been disclosed herein a phased gear assembly which may be utilized to reset a rotating shaft member to a zero position, or to a predetermined or fixed position regardless of the number of rotations through which the rotatable member may have been moved. It will also be apparent, that by means of this invention, that movement of the resetting member through a given or fixed distance will provide the accurate resetting of the rotatable shaft to a zero position. Therefore, while there has been shown and described, the present preferred embodiments of this invention as required by the patent statutes, it will be obvious to those skilled in this art, that various changes may be made in the operation or in the structural design of the various embodiments without departing from spirit and scope of the invention as set forth in the appended claims.

What is claimed as new and which it is desired to secure by Letters Patent of the United States is:

1. A rotatable shaft, phased gear means wrapped about the cylindrical surface of said shaft, a driving gear means, said driving gear means being provided with complementary phased gear means, said driving gear means being movable into engagement with said phased gear means on said rotatable shaft whereby said phased gear means of said driving gear means contacts the complementary portions of said phased gear means on said rotatable shaft to thereby rotate said rotatable shaft to a desired predetermined position.

2. A gearing assembly providing one way gearing action comprising, a rotatable shaft, first gearing means wrapped about the cylindrical surface of said shaft, a driving member, second gearing means formed on said driving member, said first gearing means comprising a helical gear means, said second gear means comprising a slot formed in the shape of said helical gear means, means for moving said driving member in a first direction so the edges of said slot will contact complementary portions of the sides of said helical gear means to thereby cause rotation of said rotatable shaft, said helical gear means and said slot being so related that movement of said driving member in a second direction opposite to said first direction will cause said helical gear means and said slot to freely move apart, leaving said rotatable shaft in the position to whcih it was rotated by the movement of said driving member in said first direction.

3. In a resetting means for a rotatable shaft for resetting the rotatable shaft to a predetermined position; a rotatable shaft, first phased gear means wrapped about the cylindrical surface of said shaft, a driving member, second phased gear means formed on said driving member, means for moving said driving member in a direction such that said second phased gear means will contact said first phased gear means to rotate said shaft, said first phased gear means and said second phased gear means having complementary phased tooth displacement such that one phased tooth of said first phased gear means will only be contacted by the complementary phased tooth of said second phased gear means, whereby movement of said second gear means in said direction resets said shaft to said predetermined position.

4. Shaft resetting means for resetting a shaft into a desired predetermined position said resetting means comprising: A rotatable shaft, first phased gear means wrapped about the cylindrical surface of said shaft, a driving member, second phased gear means complementary with said first phased gear means formed on said driving member, means for moving said driving member in a first direction whereby said second phased gear means on said driving member contacts complementary portions of said first phased gear means to rotate said shaft to a predetermined position, said moving means moving said driving member in a second direction, opposite to said first direction, in which said first and said second phased gear freely move apart from each other, thereby leaving said shaft in said predetermined position.

5. Shaft resetting means as claimed in claim 4 in which stop means are provided on said driving member, said stop means contacting a portion of said first phased gear means to thereby prevent continued movement of said driving member in said first direction.

6. Shaft resetting means as claimed in claim 4 in which said first phased gear means is in the form of gear teeth staggered about the cylindrical surface of said shaft, said driving member is in the form of a rack, and said second phased gear means is in the form of gear teeth staggered along and across said rack.

7. Shaft resetting means as claimed in claim 4 in which said first phased gear means is in the form of gear teeth having staggered displacement about the cylindrical surface of said shaft, said driving member is in the form of a sector, and said second phased gear means is in the form of gear teeth having a staggered displacement about the surface of said sector.

8. Shaft resetting means as claimed in claim 4 in which siad first phased gear means is in the form of a one-sided helical gear means wrapped about the cylindrical surface of said shaft, said driving member is in the form of a movable surface, and said second phased gear means is in the form of a single upstanding tooth having one edge formed complementary to the side of said helical gear means.

References Cited in the file of this patent
UNITED STATES PATENTS

| | | |
|---|---|---|
| 1,138,089 | Crumpton | May 4, 1915 |
| 1,722,019 | Smith | July 23, 1929 |
| 1,920,969 | Carpenter | Aug. 8, 1933 |
| 2,184,723 | Parks | Dec. 26, 1939 |
| 2,596,581 | Mercier | May 13, 1952 |